(No Model.)
F. BATEMAN.
COMBINED HARROW AND CULTIVATOR.
No. 377,980. Patented Feb. 14, 1888.
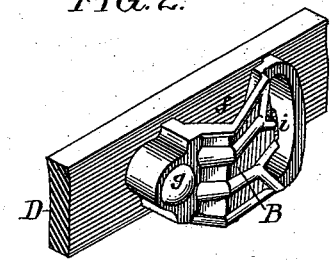
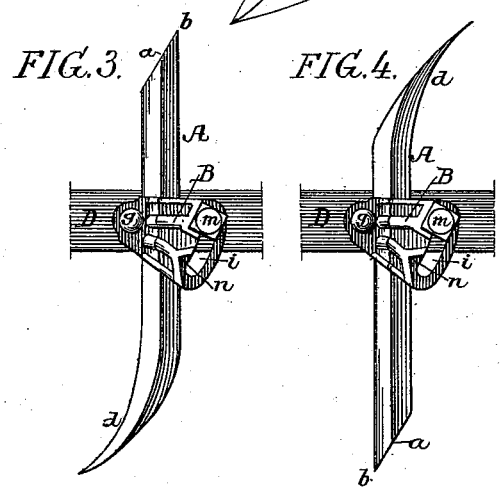
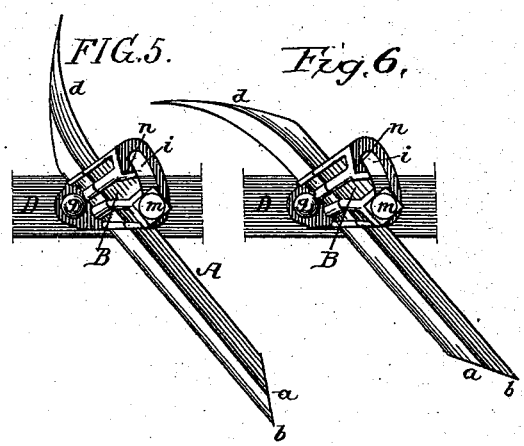
Witnesses
David S. Williams.
John E. Parker
Inventor
Frank Bateman
By his Attorneys Howson & Sons

United States Patent Office.

FRANK BATEMAN, OF SPRING MILLS, NEW JERSEY, ASSIGNOR TO HIMSELF, EDWARD S. BATEMAN, AND EDGAR C. WILSON, OF SAME PLACE.

COMBINED HARROW AND CULTIVATOR.

SPECIFICATION forming part of Letters Patent No. 377,980, dated February 14, 1888.

Application filed May 19, 1887. Serial No. 238,786. (No model.)

*To all whom it may concern:*

Be it known that I, FRANK BATEMAN, a citizen of the United States, and a resident of Spring Mills, Camden county, New Jersey, have invented certain Improvements in a Combined Harrow and Cultivator, of which the following is a specification.

The object of my invention is to so construct a tooth for a combined harrow and cultivator that the implement can be readily adapted for best performing the particular classes of work for which it is intended, and this object I attain in the manner hereinafter set forth, reference being had to the accompanying drawings, in which—

Figure 1 is a perspective view of the tooth; Fig. 2, a perspective view of the holder therefor; and Figs. 3 to 6, inclusive, side views, on a smaller scale, showing the various ways in which the tooth is intended to be used.

The tooth A consists of a bar, preferably of steel, said bar being diamond-shaped in cross-section, and being sheared off at an angle from front to rear at one end, so as to form a beveled face, *a*, and sharp point *b*, the opposite end of the bar being expanded, sharpened, and otherwise shaped so as to form a cultivator-tooth, *d*. The holder consists of a frame, B, having a recess, *f*, for the reception of the diamond-shaped tooth A, this frame having at the front end a pivot, *g*, whereby it is hung to the bar D of the fixed frame of the implement, and at the rear a segmental slot, *i*, for the reception of the stem of a bolt, *m*, whereby the frame may be secured in any desired position. This permits the tooth A to be held either in a vertical or in a rearwardly-inclined position, and the tooth is also reversible in the holder—that is to say, it can be changed end for end, or can be turned so as to bring either the front or back of the tooth in advance, thus readily adapting the tooth for the proper performance of its various duties.

Figs. 3, 4, 5, and 6 show four different adjustments of the tooth, Fig. 3 showing the cultivator-tooth *d* in acting position for cultivating small plants of tobacco, potatoes, &c., the tooth in this position having the effect of thoroughly pulverizing the soil without throwing it onto the plants.

To form a straight diamond-toothed harrow the tooth A is reversed end for end, as shown in Fig. 4, the sharp point of the tooth being in advance, and to form a smoothing-harrow it is simply necessary to shift the holder B so as to rearwardly incline the tooth, as shown in Fig. 5, the sharp point serving to cut and level the surface.

When the ground contains young plants, it is advisable to reverse the tooth so as to bring the sheared end or bevel face of the same to the front, as shown in Fig. 6, there being less risk of injuring the plants in this case than there would be if the sharp nose or point of the tooth were in front.

It will be seen that there is in the face of the holder B at each end of the slot *i* an angular recess, *n*, for the reception of one corner of the head of the bolt *m*, so that the said bolt-head serves to lock the holder in position and prevent it from swinging on its pivot under the influence of strain exerted upon the tooth A.

I do not in this application claim the peculiar form of holder which I have shown and described, as various holders may be used for securing my improved tooth to the frame of the harrow in the different positions which it has to assume; but

I claim as my invention—

The within-described tooth for a combined harrow and cultivator, said tooth consisting of a bar, diamond-shaped in cross-section, sheared at an angle from back to front at one end, and expanded and otherwise shaped to form a cultivator-tooth at the opposite end, all substantially as specified.

In testimony whereof I have signed my name to this specification in the presence of two subscribing witnesses.

FRANK BATEMAN.

Witnesses:
　WILLIAM D. CONNER,
　HARRY SMITH.